(12) United States Patent
Ciubotariu

(10) Patent No.: US 11,868,471 B1
(45) Date of Patent: Jan. 9, 2024

(54) PARTICLE ENCODING FOR AUTOMATIC SAMPLE PROCESSING

(71) Applicant: Amazon Technologies, Inc., Seattle, WA (US)

(72) Inventor: Mircea Ciubotariu, Culver City, CA (US)

(73) Assignee: Amazon Technologies, Inc., Seattle, WA (US)

(*) Notice: Subject to any disclaimer, the term of this patent is extended or adjusted under 35 U.S.C. 154(b) by 395 days.

(21) Appl. No.: 17/159,824

(22) Filed: Jan. 27, 2021

(51) Int. Cl.
G06F 21/56 (2013.01)
G06F 16/2457 (2019.01)

(52) U.S. Cl.
CPC ...... G06F 21/564 (2013.01); G06F 16/24578 (2019.01); G06F 2221/033 (2013.01)

(58) Field of Classification Search
CPC .............. G06F 21/564; G06F 21/562; G06F 16/24578; G06F 2221/033
See application file for complete search history.

(56) References Cited

U.S. PATENT DOCUMENTS 10,896,256 B1    1/2021  Saxe et al.
10,929,531 B1 *  2/2021  Kenemer .............. G06F 18/214
2012/0151586 A1 * 6/2012  Hentunen ............. G06F 21/563
                                                         726/24
2021/0117544 A1  4/2021  Kurtz et al.
2022/0237293 A1  7/2022  Schmidtler et al.
2022/0309077 A1  9/2022  Pomerantsev

OTHER PUBLICATIONS

Jeong et al.—"Malware Detection on Byte Streams of PDF Files"—Wiley—Security and Communication Networks vol. 2019, Article ID 8485365, Apr. 3, 2019 (Year: 2019).
Lam Or et al.—"MEMORY-Based Hardware Architectures to Detect ClamAV Virus Signatures with Restricted Regular Expression Features"—IEEE Transactions on Computers, vol. 65, No. 4, Apr. 2016 (Year: 2016).
Non-Final Office Action, U.S. Appl. No. 17/219,438, dated Mar. 27, 2023, 10 pages.
Stolfo et al.—"Fileprint analysis for Malware Detection"—Columbia IDS Lab, Jun. 2005 (Year: 2005).

* cited by examiner

Primary Examiner — Brian F Shaw
(74) Attorney, Agent, or Firm — Nicholson De Vos Webster & Elliott LLP

(57) ABSTRACT

A method of particle-based threat scanning may include obtaining a sample from a sample source, generating a plurality of particles from the sample, wherein each particle from the plurality of particles is an array of unique bytes generated based on one or more particle properties, and determining whether the sample is associated with a known threat by comparing the plurality of particles to particle threat signatures in a threat database.

20 Claims, 8 Drawing Sheets

500

OBTAINING A SAMPLE FROM A SAMPLE SOURCE 502

GENERATING A PLURALITY OF PARTICLES FROM THE SAMPLE, WHEREIN EACH PARTICLE FROM THE PLURALITY OF PARTICLES IS AN ARRAY OF UNIQUE BYTES GENERATED BY PARSING THE SAMPLE BASED ON ONE OR MORE PARTICLE PROPERTIES 504

DETERMINING WHETHER THE SAMPLE IS ASSOCIATED WITH A KNOWN THREAT BY COMPARING THE PLURALITY OF PARTICLES TO PARTICLE THREAT SIGNATURES IN A THREAT DATA STORE 506

PARTICLE ENCODING FOR AUTOMATIC SAMPLE PROCESSING

BACKGROUND

Malware scanning can be used to identify malicious software, such as computer viruses, on storage volumes. The easiest way to identify threat files is by hash, in which a hash is computed using a hashing algorithm for a file and compared to a threat list and/or safe list to determine whether the file is a known threat or a known clean file. Traditional hash-based systems generate an individual hash for each file. However, this requires computing trillions of hashes, some of which may correspond to large files, which is computationally expensive and difficult to scale.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for particle encoding for automatic sample processing. According to some embodiments, particle encoding enables threat patterns to be detected based on regular expressions. This allows for a given sample to be classified as a threat more broadly, as a pattern can be found to cover different threat samples. Traditional threat scanning systems use hashing to uniquely identify particular threats. Being able to identify threats more generically (e.g., based on data that is shared by threats but not by non-threats) can improve scanning performance by reducing the amount of data needed to reliably identify a potential threat. For example, instead of computing full hashes for every sample, embodiments compute particles of samples. A particle is an array of bytes where repeating bytes have been omitted, as the repeating bytes provide too little information for identification purposes (e.g., uniqueness). To be effective, these particles must be of a form that is readily usable by machines for automated threat detection. Additionally, the size of the particles should be as small as possible to detect threats reliably without risking false positives due to collisions with safe samples.

In some embodiments, particles are generated from known threats to create a particle threat data store. When an unknown sample is scanned, its particles can be generated and compared to the particles of known threats. If there is significant overlap (e.g., the unknown sample shares above a threshold number of particles with one or more known threats), then the unknown sample can be classified as a threat. In some embodiments, the particles of known safe samples can be used to reduce the false positive rate. For example, the particles of a new family of threats can be used to generate a threat signature based on the most commonly co-occurring particles among the samples of the threat family. These particles can then be compared to the safe particle data store to exclude any particles from the threat signature that are likely to collide with safe particles. The resulting threat signature is therefore tailored to the particles that represent the threatening portion of the samples themselves, making subsequent matches of this threat signature more reliably indicative of a threat sample.

Figure 1:
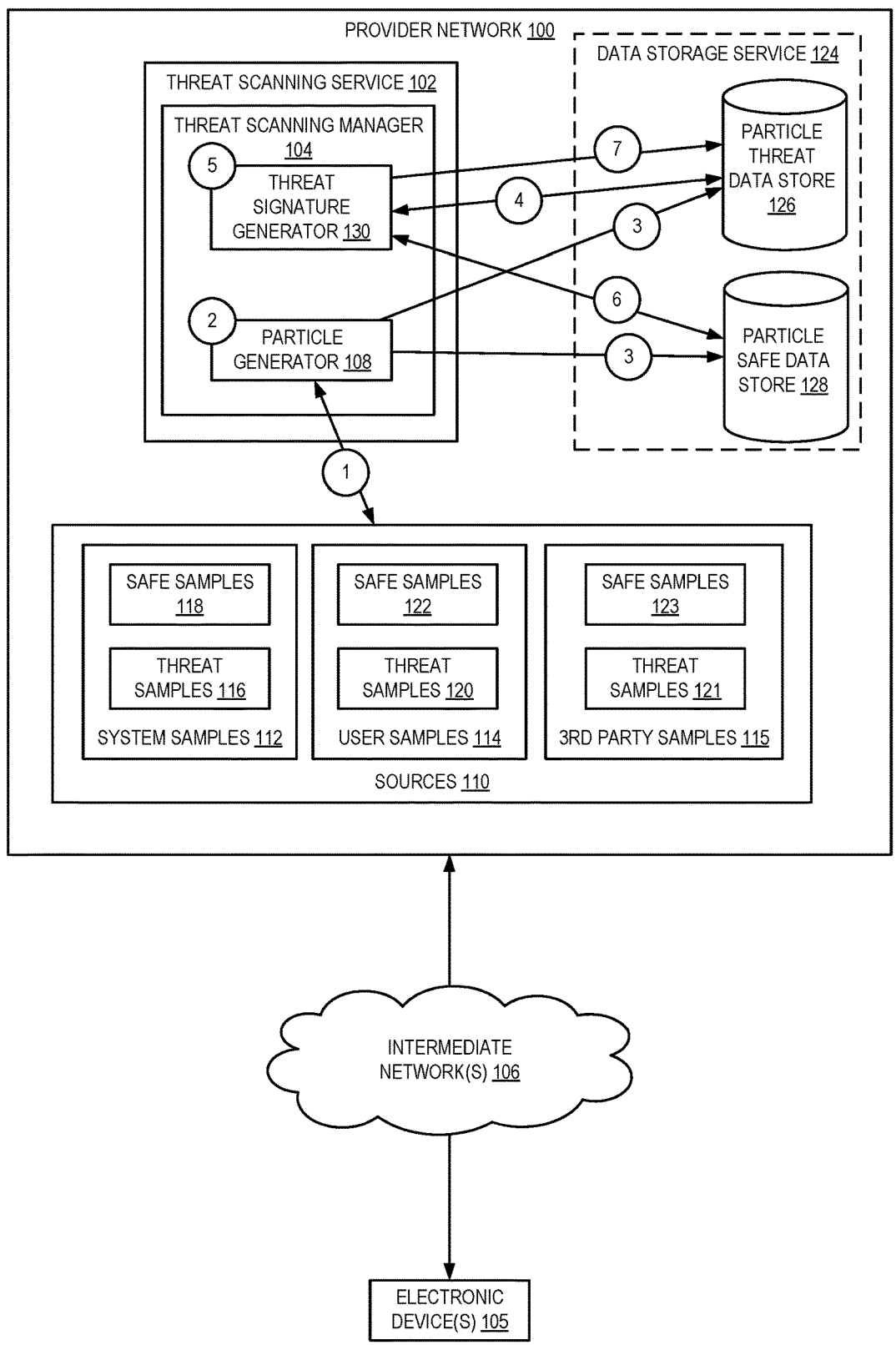
FIG. 1 is a diagram illustrating an environment for generating particles for threat samples and safe samples according to some embodiments.

FIG. 1 is a diagram illustrating an environment for generating particles for threat samples and safe samples according to some embodiments. As shown in FIG. 1, a provider network 100 includes threat scanning service 102. Threat scanning service 102 implements the particle-based threat scanning techniques described herein. In various embodiments, threat scanning service 102 scans samples from a plurality of sources, which may include customer resources, provider network resources, etc. The threat scanning service 102 can compute particles from the samples and use these particles to build a particle threat data store and a particle safe data store. These particle data stores are used to generate reliable particle threat signatures for new threat families and to identify unknown samples as either malicious or safe.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc., using one or more electronic devices 105. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

In various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown in FIG. 1, threat scanning service 102 includes a threat scanning manager 104 which includes a particle generator 108. Threat scanning manager 104 can manage generation of particle threat data store 126 and particle safe data store 128. These data stores can each include particles associated with known threat samples and known safe samples. In some embodiments, these data stores may be implemented in a data storage service 124, such as a database service, block storage service, object storage service, etc. Additionally, the particle threat data store 126 and particle safe data store 128 may be implemented as various data structures, such as databases, At numeral 1, particle generator 108 of threat scanning manager 104 can read one or more samples from one or more sources 110. As discussed, this may include one or more files, memory dumps, disk images, etc. In particular, the sources 110 used to generate the particle threat data store 126 and particle safe data store 128 can include known safe samples 118, 122, 123 and known threat samples 116, 120, 121. These samples may be provided by provider network 100 (e.g., system samples 112), by one or more users (e.g., user samples 114), and/or by third party malware monitoring services (e.g., third party samples 115). At numeral 2, the particle generator 108 then generates particles for each sample. Although a single particle generator is shown in FIG. 1, in various embodiments a plurality of particle generator instances may be employed to process samples in parallel.

As discussed, a particle is a sequence of non-repeating bytes (e.g., each byte in a particle is unique as compared to every other byte in that particle) extracted from a sample that can be used to reliably identify threat samples (e.g., malware). Ideally, particles should be as small as possible while still being able to reliably identify threats without collisions with safe samples (resulting in false positives). This minimum size depends on the quantity and type of data that will be scanned by the threat scanning service 102. Based on the types of data typically stored by a cloud storage provider and an examination of the typical size distribution of this data, a cloud storage provider may be expected to store approximately $2^{64}$ bytes of data. Statistically, a pattern of 8 bytes is almost guaranteed to be identified at least once in a dataset this size. Almost, because it also matters what kind of data it is, as for example repetitions of both low and high entropy data (low entropy data is in fact repeated data) directly reduce the meaningful data amount for the analysis. For example, if the same 7.5 GB ISO image exists in 10000 customer storage locations, that reduces the actual meaningful data to about $2^{46}$ bytes. The threat scanning service may be expected to scan data across multiple storage services, so even taking into account a conservative estimate of redundant data, $2^{64}$ bytes of eligible (e.g., scannable) data remains a reasonable estimate of the amount of data to be scanned. Based on the estimated rate of growth of data (e.g., roughly doubling every 20 months, based on storage capacity evolution), the amount of eligible data is expected to grow to about $2^{81}$ bytes over 30 years.

Taking into account the future growth of data size, the minimum amount of data needed for reliable detection can be computed as the size exponent number (or the number of bits needed to represent the size, 81) and divide it by 8, resulting in 10.125 bytes. It means a detection added today based on 10 non-repeating bytes would be enough for up to 30 years. Adding two more bytes, to a total of 12 non-repeating bytes, would reduce the probability of a false positive in the eligible data to 1/32768, or 0.0031% FP chance after 30 years.

The particles include non-repeating bytes because this is a fundamental trait of high entropy data, which is the type of data that yields the most useful amount of information. In other words, high entropy data is best for extracting threat definitions. For example, by choosing a string of 12 non-repeating bytes of a malicious archive would assure reliability of threat detection over time.

The problem is much of the threat data has medium entropy values, making it difficult to find good non-repeating byte patterns. To account for this, particles can be generated by counting 1 byte for every unique byte in a pattern, effectively not counting repeating bytes towards the pattern's total amount of information. However, it is often difficult to identify 12-byte particles, therefore it may be useful to use smaller particle sizes. For example, while a 6-byte particle may be found repeatedly in the eligible data set (across both threat samples and safe samples), the chance of that particle appearing in any particular sample is much smaller. As discussed, a particle this small may have an unacceptably high risk of false positives. Instead, if multiple, non-overlapping 6-byte particles are matched, then the confidence of matching a true threat increases. For example, the odds of finding multiple particles by chance in a single sample decrease exponentially with the sample size and linearly with the number of particles matched.

Accordingly, at numeral 2, the particle generator 108 generates particles for the known threat samples and known safe samples based on a number of particle properties. For example, the particles generated may be a minimum of 6 bytes. As discussed further below, particles may be encoded to fit into a primitive data type. For example, a u64 data type can include 8 bytes of data. An 8-byte particle can therefore be readily represented as a u64 type. However, a smaller particle with repeating bytes may not be so readily represented. For example, a 6-byte particle having three repeating bytes (e.g., 9 total bytes) may be compressed to be represented as a u64 type. Additional details regarding this compression scheme are provided below.

The particles can be added to their respective data store at numeral 3 (e.g., particles from known threats added to particle threat data store 126 and particles from known safe samples added to particle safe data store 128). Additionally, the association between the particles and the samples from which they are generated is also maintained. For example, the particles of a known threat sample can be stored in particle threat data store with an identifier associated with the threat sample from which they were generated, and likewise for the particles of safe samples.

As discussed, higher entropy data generally results in a better source of particles, since there are far fewer repetitions expected in it. However high entropy data is mostly a by-product of two major processes: compression, where certain patterns are reduced in order to save storage space; and encryption, where plaintext is transformed through some mathematical function. Both of these processes produce unique sets of data that change dramatically overall with small changes in the underlying data. This results in extracting a large number of particles that do not provide much information about the underlying samples. Accordingly, to keep the particle data stores lightweight, and to avoid adding less useful particles to the data stores, in some embodiments, particle generator 108 selectively stores particles based on the properties of those particles. For example, in some embodiments, when particle generator 108 generates a 6-byte particle which has been compression encoded with multiple byte repetitions, the particle generator identifies this particle as an anchor particle and starts a counter. The particle generator then stores a configurable number of consecutive raw encoded particles following the anchor particle. After the configurable number of consecutive particles have been stored, any further raw encoded particles are discarded until a new anchor particle is identified. The configurable number of consecutive particles is then reset, and the process continues. In some embodiments, the number of consecutive raw encoded particles can be between 12 and 128.

In some embodiments, a threat definition (e.g., one or more particles and/or a sequence of particles) can be defined for each new family of threat samples. The particle generator 108 can generate particles for the samples associated with the new family of threat samples. As discussed, the particle generator 108 adds the particles to particle threat data store 126. Threat signature generator 130 can obtain the particles associated with the new family of threat samples using identifiers associated with the threat samples belonging to the new family at numeral 4. At numeral 5, the threat signature generator can determine a subset of the particles that appear in all of the threat samples belonging to the new family and/or a subset of particles that appear most frequently across the threat samples of the family Additionally, or alternatively, the threat signature generator 130 can determine a subset of the particles that appear in at least a threshold number of the threat samples of the new family. For example, if a particle appears in more than 75% (or other threshold number) of threat samples of the new family, then it can be added to the subset. This subset of particles can then be compared to the particles in the particle safe data store 128 at numeral 6. Any particles in the subset that collide with safe particles can be removed from the subset. The resulting subset of particles are those most likely to be associated with the threat of the new threat family and least likely to result in a false positive when used to classify unknown samples. The subset of particles can then be updated in the particle threat data store 126 at numeral 7 to be associated with a threat signature assigned to the new threat family.

As discussed, the threat signature may include a plurality of particles that are most likely to be shared among related threats and least likely to collide with particles of safe samples. In some embodiments, for a sample under test to match a given threat signature, the sample does not have to exactly match all of the particles in the threat signature. Instead, if a subset of particles match, then the sample can be classified as a threat for matching the threat signature. The number of particles needed to match may vary depending on the length of the particles, the data set size, etc. This produces more generic signatures that are not only reliable, but also resilient to changes in the threat samples, providing detection while threat samples may change. This way, as threats evolve, they can still be reliably identified, without requiring all particles to match.

Figure 2:
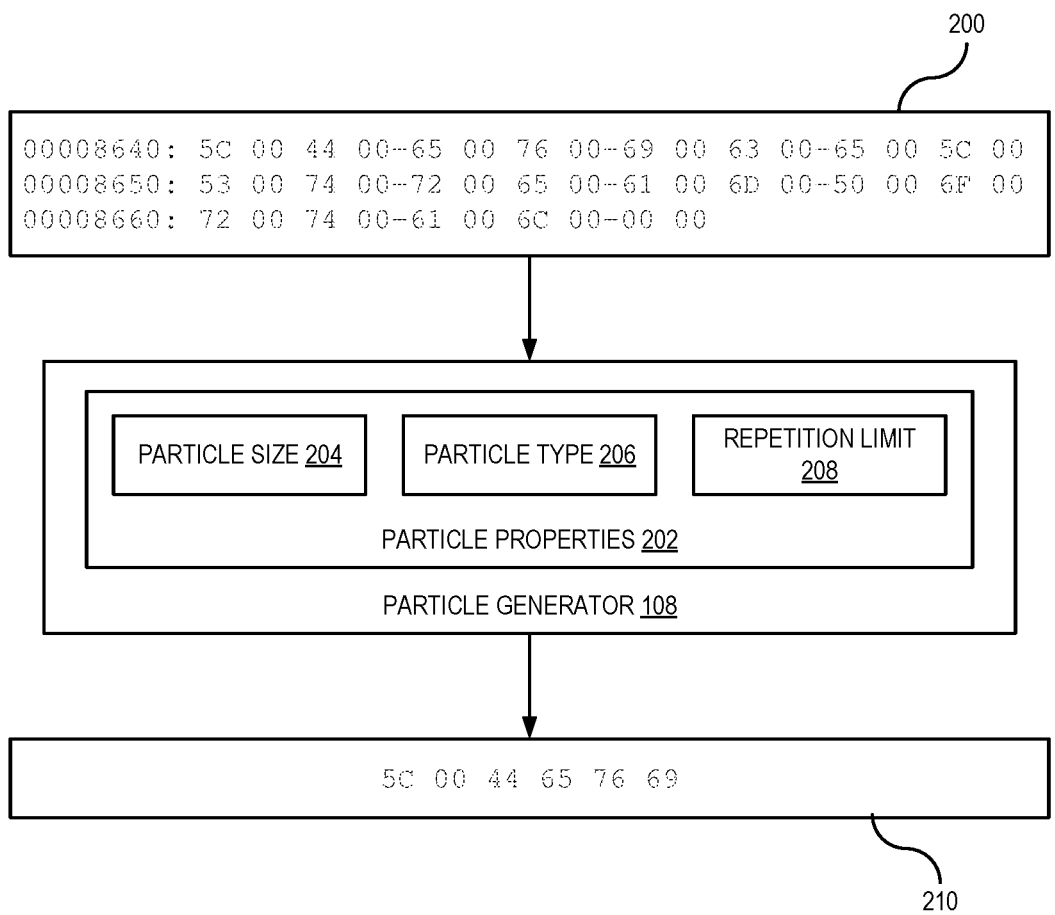
FIG. 2 is a diagram illustrating an example of particle generation according to some embodiments.

FIG. 2 is a diagram illustrating an example of particle generation according to some embodiments. As discussed, particle generator 108 can receive a sample 200 and generate a particle 210 based on various particle properties 202. For example, the particle properties 202 may include a particle size (e.g., minimum and/or maximum size), a particle type 206 (e.g., the data type associated with the particle), and a repetition limit 208 (e.g., the number of times a repeating byte can be present in a particle).

In some embodiments, the particle size 204 may be limited to at least 6 bytes. As discussed, smaller sized particles may appear too frequently to be useful for identifying threats (e.g., the chances for collisions with safe sample particles increase exponentially as the particle size is reduced). In some embodiments, the particle type 206 may be chosen to be a fixed width data type, and preferably a primitive data type. Using a standardized data type improves sample processing performance during threat scanning and other automated processing tasks. Additionally, in some embodiments, the repetition limit can be set to three repetitions. This enables some lower entropy types of data (such as Unicode strings) to be captured, while capturing particles with more repetitions would result in less useful information being captured in particles. Additionally, by limiting particles to at least 6 bytes, and at most three repetitions, the resulting 9-byte sequence can be compression encoded into a u64 type, as discussed below. The particle properties used for a given implementation may vary depending on the type and amount of data being scanned, the particle type being implemented, etc.

For example, sample 200 includes a sequence of bytes from a Unicode string 5C 00 44 00-65 00 76 00-69. Using the particle properties described above, each unique byte can be added to a particle and the particle can include up to three repetitions of bytes. For example, Sc 00 44 includes no repeating bytes, so three bytes have been added to the particle. The next byte 00 is a repetition of the second byte in the particle and is therefore removed. The next byte 65 is unique and added to the particle, resulting in 4 bytes, still short of the 6-byte minimum. The next byte is 00, a second repetition, and discarded. The next byte is 76, another unique byte which can be added to the particle resulting in 5 bytes. The next byte is 00, which is the third and maximum number of repetitions and is discarded. The next byte, 69 is unique and added to the particle. As such, the resulting particle 210 includes 6 bytes and three repetitions.

Figure 3:
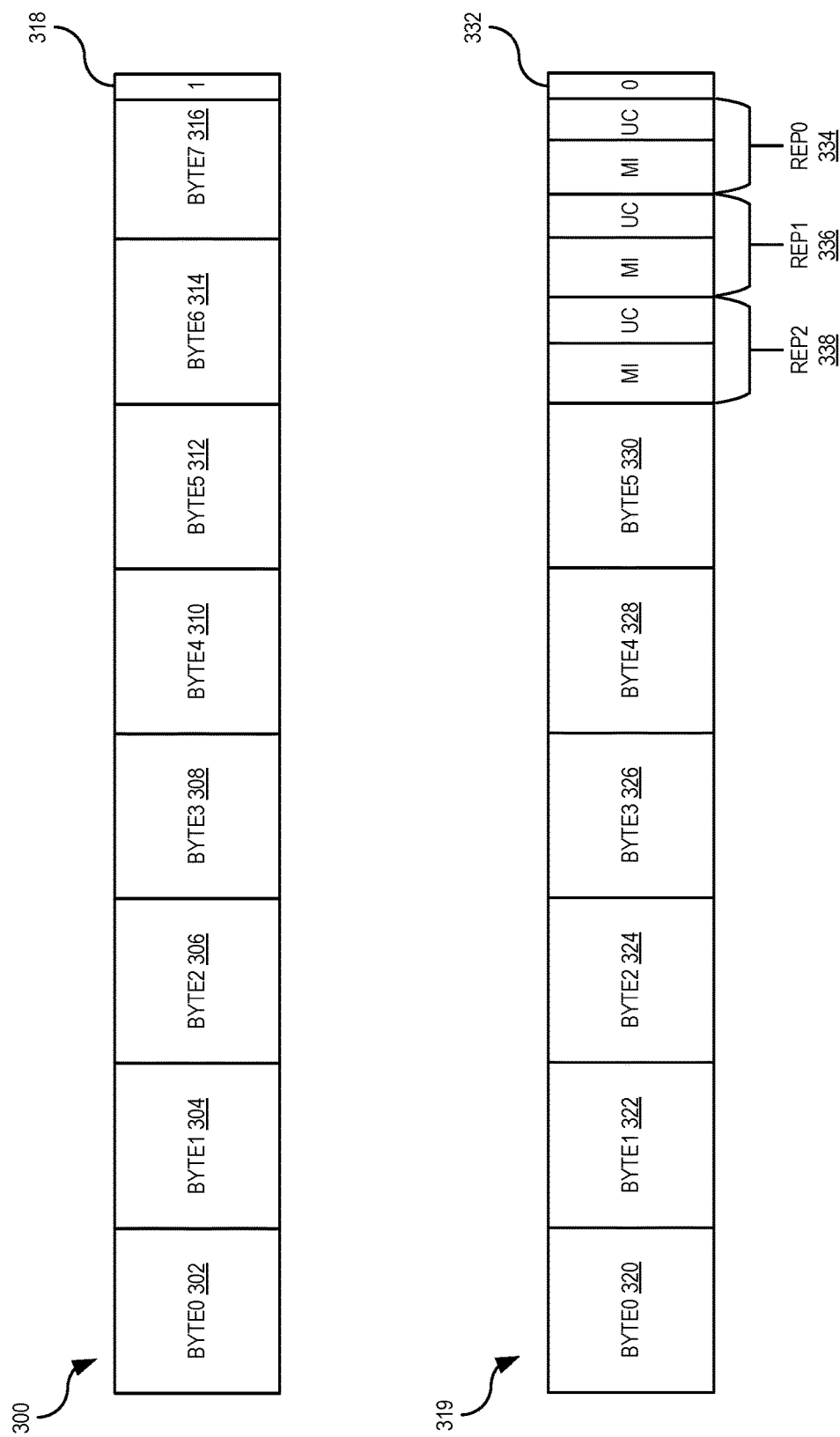
FIG. 3 is a diagram illustrating an example of particle encoding according to some embodiments.

FIG. 3 is a diagram illustrating an example of particle encoding according to some embodiments. As shown in FIG. 3, a u64 primitive type can be used to represent 8-byte particles with no repetitions, 7-byte particles with 1 repetition, or 6-byte particles with two repetitions. For example, each of these particles occupies the full 8 bytes of the u64 type. However, if up to three repetitions are allowed based on the particle properties, as described above, then 9 bytes would be needed to represent a 6-byte particle with three repetitions. Accordingly, embodiments implement a compression scheme to enable 6-byte particles with three repetitions to be represented using a u64 type, as shown in FIG. 3.

For example, as shown in FIG. 3, a u64 data type can include 8 bytes of particle data (e.g., byte0 302 to byte7 316). One bit, bit 318, can be reserved as a signal bit to indicate whether a given u64 has been compressed or whether it has not been compressed (e.g., if it is a raw encoding). As shown in FIG. 3, bit 318 is 1, indicating that the particle 300 is not compressed. Particle 319 shows an example of a compressed particle. As shown, particle 319 includes 6 bytes: byte0 320 to byte5 330. The last two bytes of data of the u64 particle are reserved to encode information representing the repetition data. The signal bit, bit 332, is 0 indicating that this particle 319 is compressed.

When the compression encoding is present, two bytes (e.g., 16 bits) including the signal bit are used to describe the repetitions inside the particle. Each repetition 334, 336, 338 is associated with a unique code (UC) and a match index (MI). The unique code is 2 bits and indicates the number of bytes before the repetition. The match index is 3 bits and indicates the index of the byte being repeated. In some embodiments, to optimize the particle validation and extraction process and to accommodate the compression encoding, particles are selected so that the first 3 bytes are different from each other. So byte0 302, byte1 304, and byte2 306 of particle 300 are all unique values. Likewise, byte0 320, byte1 322, and byte2 324 of particle 319 are all unique values. As such, repetitions can be found only starting with byte index 3, therefore a repetition at byte3 has a UC of 0. By using this scheme, the 9-byte array representing a particle can be compressed to the 64-bit structure and vice-versa.

Using the example of FIG. 2, the Unicode string 5C 00 44 00-65 00 76 00-69 can be encoded as particle 5C 00 44 65 76 69, this 6-byte array can be compressed into a particle as follows:

| 00 | 01 | 02 | 03 | 04 | 05 |
|----|----|----|----|----|----|
| 5C | 00 | 44 | 65 | 76 | 69 |

As shown above, the Unicode string includes three repetitions of byte 00. when the three repeating bytes are removed, the 6-byte particle is the result. As such, rep0, rep1, and rep2 need to encode the positions and values of the repetitions that have been removed. Therefore, following byte2, corresponding to the value 44, is a repeated value of byte1, corresponding to the value 00. As such, the first repetition, rep0, is encoded as UC0=0, MI0=1. UC is equal to 0 because the repetition occurs at the first position (e.g., byte3) where a repetition can occur. MI is equal to 1, because byte1 is the byte value being repeated. The next repetition follows byte3. The UC value of rep1 is 1, as the next repeated byte follows byte3. The corresponding MI of rep1 is also 1, as the repeated byte is again a repetition of byte1. The final repetition follows byte4. The UC value of rep1 is 1, as the next repeated byte follows byte4. The corresponding MI of rep1 is also 1, as the repeated byte is again a repetition of byte1.

Figure 4:
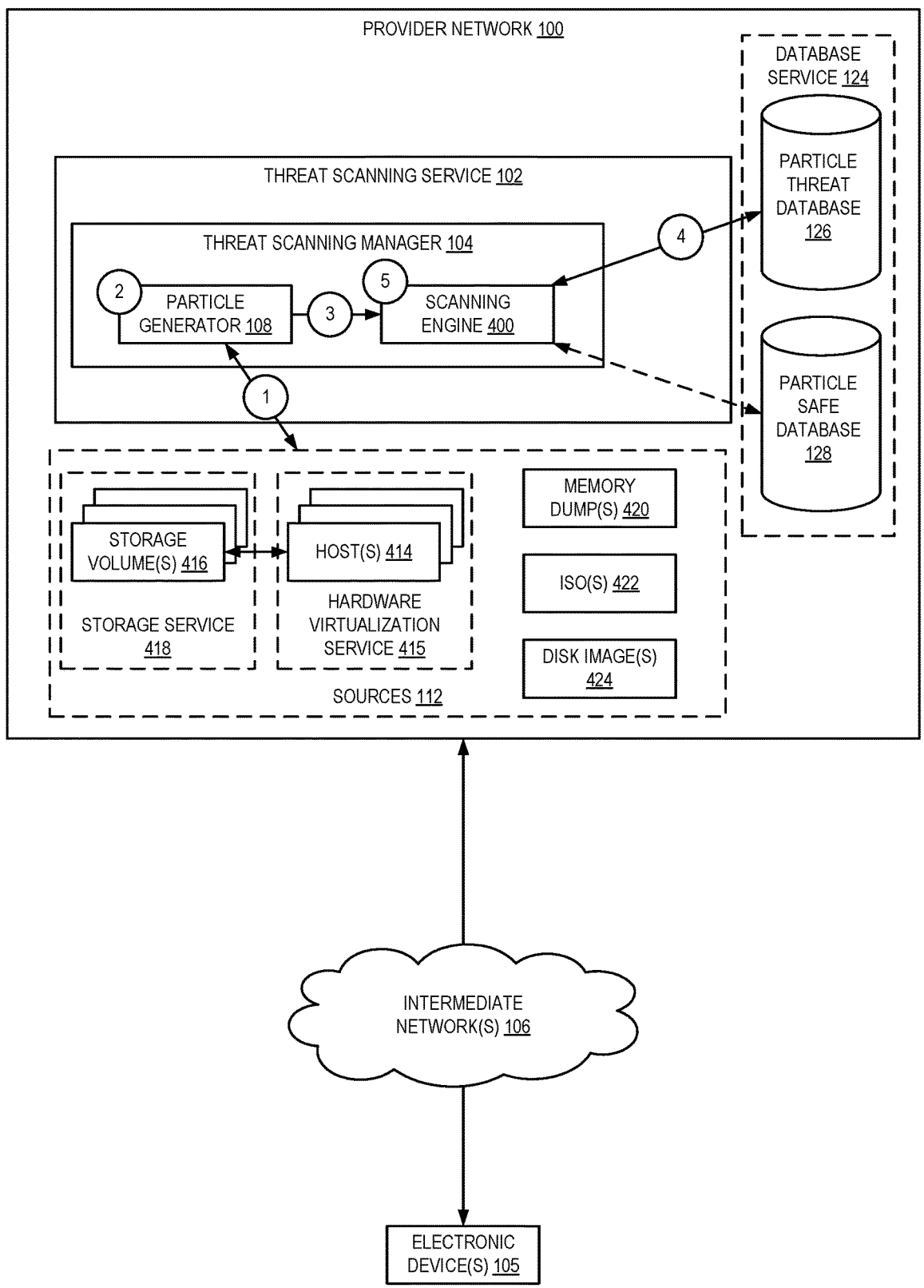
FIG. 4 is a diagram illustrating an environment for particle-based threat scanning according to some embodiments.

FIG. 4 is a diagram illustrating an environment for particle-based threat scanning according to some embodiments. In various embodiments, threat scanning service 102 scans samples from a plurality of sources, as shown at numeral 1. These sources 110 may include customer resources, provider network resources, etc. The threat scanning service 102 can compute particles for the samples and compare these particles to particle threat database 126 to identify malicious samples. Threat scanning manager 104 can manage periodic and/or on-demand threat scanning of sources 110. Sources 110 can include various data sources from which samples can be scanned. For example, sources 110 can include a plurality of storage volumes 416 maintained by storage service 418. These storage volumes may be mounted to a plurality of hosts 414 provided by hardware virtualization service 415. Additionally, or alternatively, the sources may include memory dumps 420, ISO containers, 422, disk images 424, etc.

The hardware virtualization service 415 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Particle generator 108 generates particles of the samples, as discussed above, at numeral 2. As discussed, during particle generation, a sample can be parsed to identify particles that have specific particle properties. For example, particles may have a minimum size in bytes, in number of repetitions, etc. Additionally, as discussed, particles may need to meet certain requirements for encoding purposes. For example, any particle identified that does not start with three unique bytes may be discarded. Likewise, any particle with more than a threshold number of repetitions and/or too small may be discarded. This parsing continues until the sample under test has been completely parsed into particles.

At numeral 3, the particles of a given sample are provided to a scanning engine 400 to be compared to particles in particle threat database 126. The scanning engine 400 can lookup the particles in particle threat database 126, at numeral 4. Optionally, in some embodiments, the scanning engine can additionally cross reference the particles of the sample under test with particles from the particle safe database 128. This may be performed as queries, binary searches, etc. depending on the implementation of the particle threat database 126. As discussed, each particle in the particle threat database is associated with an identifier of the threat sample from which it was generated. Accordingly, the scanning engine can determine the overlap between the sample under test and known threat samples, at numeral 5. The scanning engine can compute a similarity index that represents this overlap. The similarity index may be calculated as a percentage of particles shared between the sample under test and each threat sample against the total number of particles of the sample under test. For example, if the sample under test has 1000 particles, and it shares 900 particles with a threat sample, then the similarity index is 90%. The higher the similarity index the more likely the samples are related, if it is 100% it is likely the samples are identical. but based on how we extract particles there could be some low entropy data that has changed so they are not identical. Accordingly, if the similarity index is above a configurable threshold value (e.g., 50%, 60%, etc.), then the sample under test can be automatically classified as a threat without additional analysis. This reduces the time required to identify threats, improving threat scanning performance.

In some embodiments, the scanning engine can attempt to match the particles of the sample to one or more threat signatures. As discussed, the threat signature may include a plurality of particles that are most likely to be shared among related threats and least likely to collide with particles of safe samples. If the scanning engine determines that the particles from the sample under test match (e.g., overlap) with at least a subset of the particles of a threat signature, then the sample under test can be classified as a threat for matching the threat signature. As discussed, the number of particles needed to match may vary depending on the length of the particles, the data set size, false positive risk, etc. This threshold number may be set by an administrator or other entity associated with the threat scanning service and/or the owner of the data being scanned.

In some embodiments, in addition to checking for matching particles, the scanning engine 400 can check for matching sequences of particles (e.g., matching particles that occur in the same order in multiple samples). Checking the matched particles' sequence yields exponential reduction in the false positive chance with the number of particles used, because the probability of each match to be in the desired sequence is on average 50% which adds 1 bit of information. The match sequence can be checked by making sure pattern ids increase with increasing match offsets.

Figure 5:
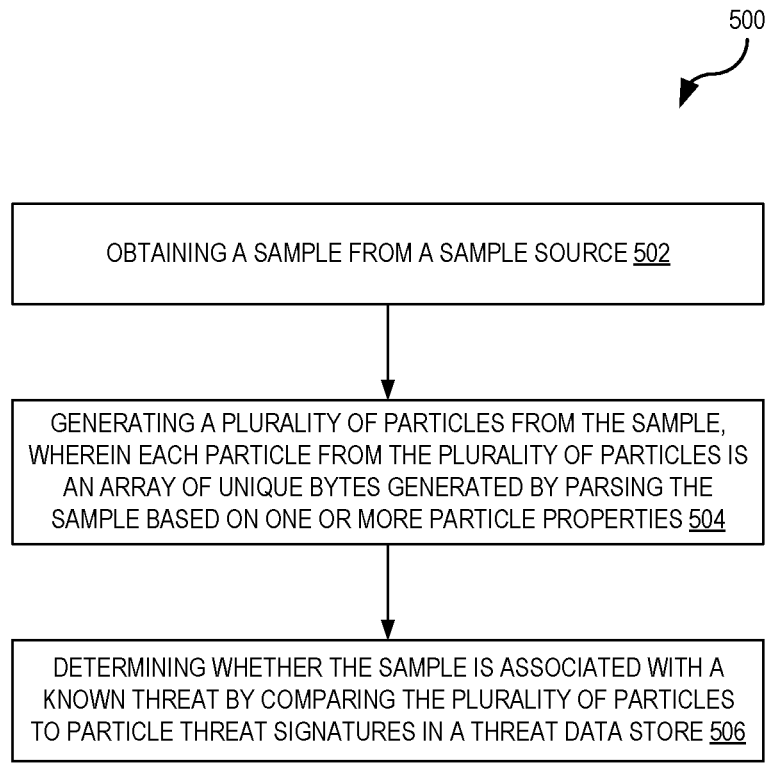
FIG. 5 is a flow diagram illustrating operations of a method for particle-based threat scanning according to some embodiments.

FIG. 5 is a flow diagram illustrating operations 500 of a method for particle-based threat scanning according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by threat scanning service 102 of the other figures.

The operations 500 include, at block 502, obtaining a sample from a sample source. In some embodiments, the sample source includes one or more of a storage service, a memory dump, a disk image, or an ISO container. Additionally, or alternatively, the sample source can include known threat samples (e.g., malware) and/or known safe samples (e.g., samples belonging to a safe list).

The operations 500 include, at block 504, generating a plurality of particles from the sample, wherein each particle from the plurality of particles is an array of unique bytes generated based on one or more particle properties. For example, the bytes of a particle are unique as compared to other bytes in that particle. In some embodiments, generating a plurality of particles includes parsing the sample to identify a first array of bytes, removing at least one repeating byte from the first array of bytes based on the one or more particle properties to generate a first array of unique bytes, and compressing the first array of unique bytes to generate a first particle. In some embodiments, compressing the first array of unique bytes to generate a first particle, further comprises storing a value in a signal bit of the particle to indicate that the first particle is compressed, and encoding a unique code and a match index for each of the at least one repeating byte removed from the first array of bytes, the unique code identifying a location of the at least one repeating byte in the first array of bytes, and the match index identifying a byte corresponding to a value of the at least one removed byte.

In some embodiments, generating a plurality of particles from the sample, wherein each particle from the plurality of particles is an array of unique bytes generated based on one or more particle properties, further comprises parsing the sample to identify a first array of bytes, removing at least one repeating byte from the first array of bytes based on the one or more particle properties to generate a first array of unique bytes, encoding the first array of unique bytes into a first particle, wherein a signal bit of the first particle includes a value indicating that the first particle is not compressed. In some embodiments, the one or more particle properties include one or more of a minimum number of bytes, a data type, or a maximum number of repeating bytes.

The operations 500 include, at block 506, determining whether the sample is associated with a known threat by comparing the plurality of particles to particle threat signatures in a threat database. In some embodiments, determining whether the sample is associated with a known threat by comparing the plurality of particles to particle threat signatures in a threat database, further comprises determining the plurality of particles from the sample overlap with a subset of particles associated with the threat signature and identifying the sample as a threat.

In some embodiments, the operations further include obtaining a plurality of samples associated with a threat family, generating a plurality of particles for each sample from the plurality of samples, identifying a subset of particles shared by the plurality of samples, and storing the subset of particles as a threat signature associated with the threat family.

In some embodiments, identifying a subset of particles shared by the plurality of samples, further comprises comparing the subset of particles shared by the plurality of samples to particles associated with safe samples stored in a particle safe data store, and removing at least one particle from the subset of particles that collides with the particles associated with the safe samples.

In some embodiments, the operations include obtaining a first plurality of samples from a sample source of known malware, generating a first plurality of particles from each sample from the first plurality of samples, wherein each particle from the first plurality of particles is an encoded array of non-repeating bytes having a minimum number of bytes and a maximum number of byte repetitions removed, storing the first plurality of particles from each sample from the first plurality of samples in a threat database, the first plurality of particles associated with their respective samples, obtaining a second plurality of samples from a sample source of known safe samples, generating a second plurality of particles from each sample from the second plurality of samples, and storing the second plurality of particles from each sample from the second plurality of samples in a safe database, the second plurality of particles associated with their respective samples.

In some embodiments, the operations further include obtaining a file from a file source being scanned, parsing the file to generate one or more particles, and calculating a similarity score based on a number of particles that match a threat sample from the threat database. In some embodiments, the operations further include determining the similarity score is greater than a threshold value and classifying the file as a threat.

Figure 6:
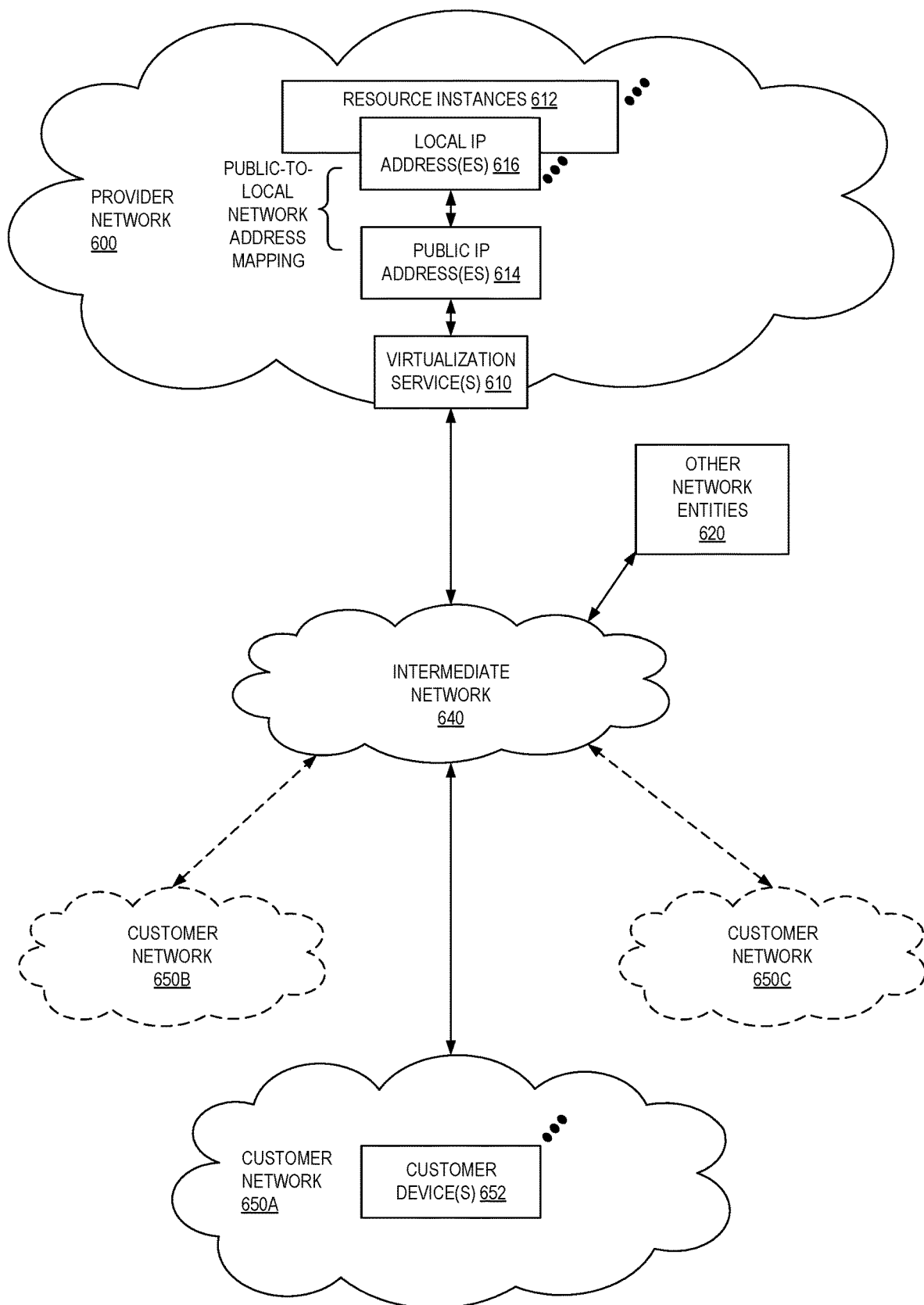
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address

614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
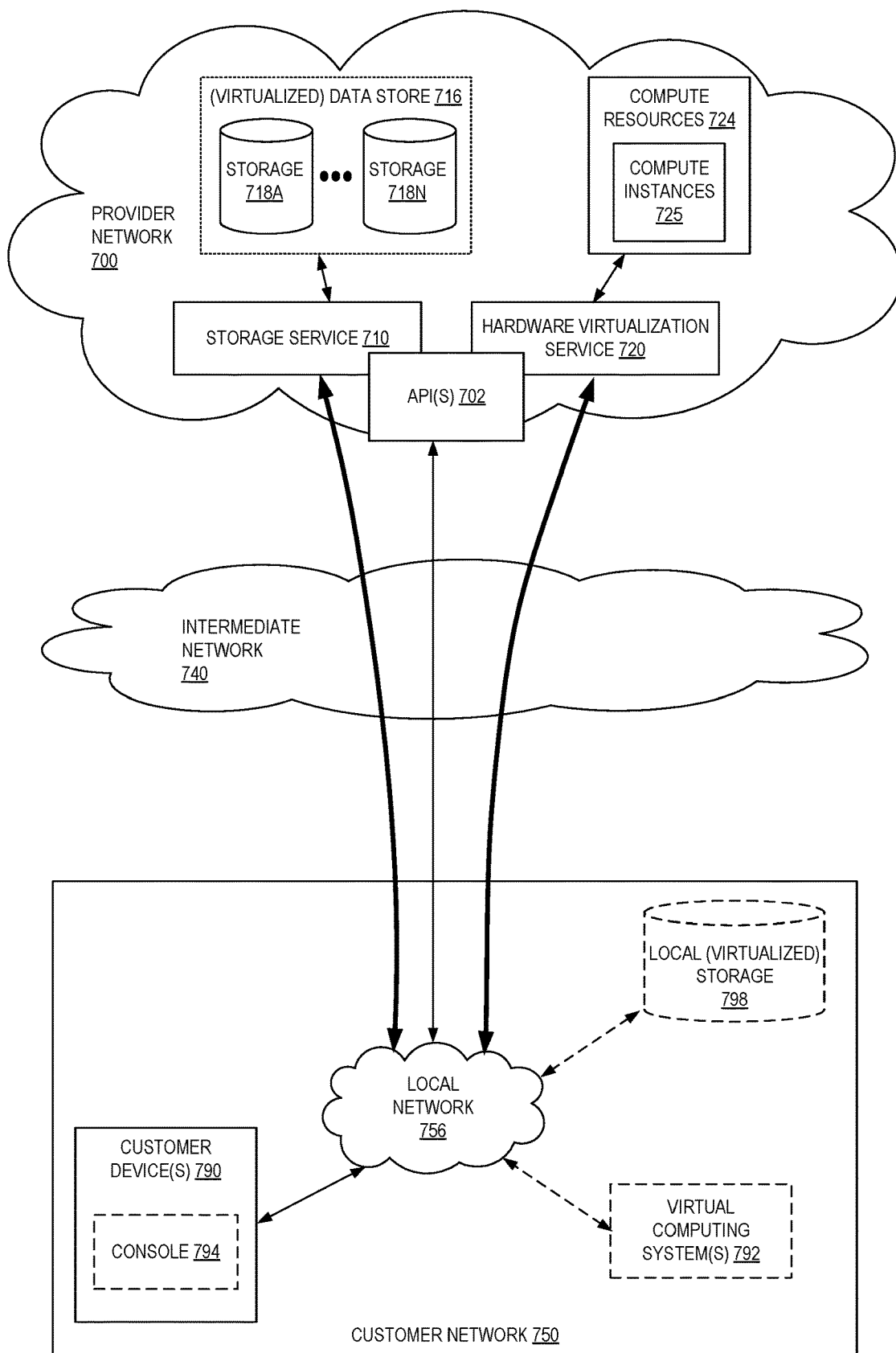
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
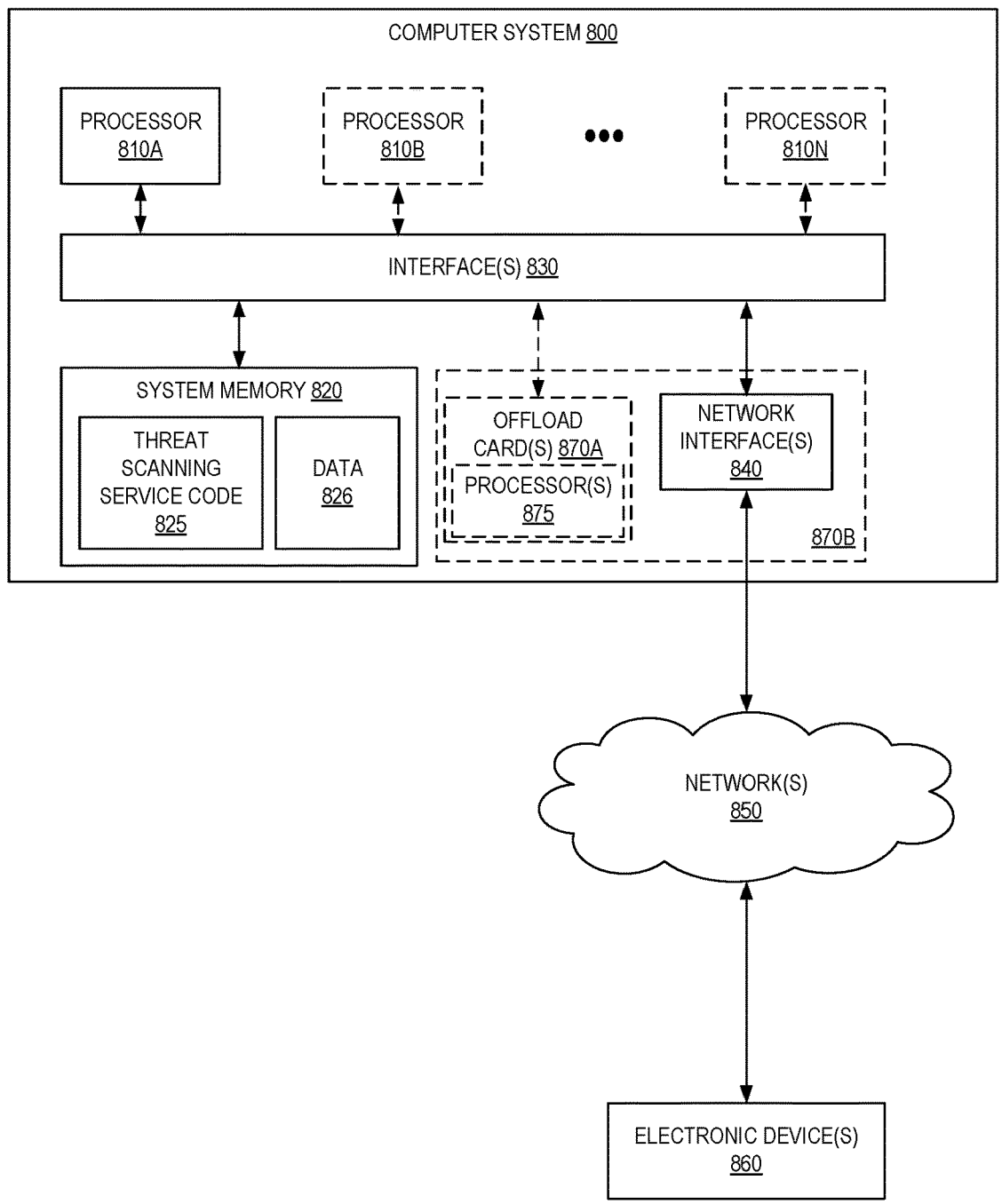
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as threat scanning service code 825 (e.g., executable to implement, in whole or in part, the threat scanning service 102) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s)

can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    obtaining a sample from a sample source;
    generating a plurality of particles from the sample, wherein each particle from the plurality of particles is an array of unique bytes generated based on one or more particle properties, and wherein the generating comprises:
        parsing the sample to identify a first array of bytes;
        removing at least one repeating byte from the first array of bytes based on the one or more particle properties to generate a first array of unique bytes; and
        compressing the first array of unique bytes to generate a first particle of the plurality of particles; and
    determining whether the sample is associated with a known threat by comparing the plurality of particles to particle threat signatures in a threat database.

2. The computer-implemented method of claim 1, wherein compressing the first array of unique bytes to generate a first particle of the plurality of particles, further comprises:
    storing a value in a signal bit of the particle to indicate that the first particle is compressed; and
    encoding a unique code and a match index for each of the at least one repeating byte removed from the first array of bytes, the unique code identifying a location of the at least one repeating byte in the first array of bytes, and the match index identifying a byte corresponding to a value of the at least one removed byte.

3. The computer-implemented method of claim 1, wherein the one or more particle properties include one or more of a minimum number of bytes, a data type, or a maximum number of repeating bytes.

4. The computer-implemented method of claim 1, further comprising:
    obtaining a plurality of samples associated with a threat family;
    generating a plurality of particles for each sample from the plurality of samples;
    identifying a subset of particles shared by the plurality of samples; and
    storing the subset of particles as a threat signature associated with the threat family.

5. The computer-implemented method of claim 4, wherein identifying a subset of particles shared by the plurality of samples, further comprises:
    comparing the subset of particles shared by the plurality of samples to particles associated with safe samples stored in a particle safe data store; and
    removing at least one particle from the subset of particles that collides with the particles associated with the safe samples.

6. The computer-implemented method of claim 5, wherein determining whether the sample is associated with a known threat by comparing the plurality of particles to particle threat signatures in a threat database, further comprises:
    determining the plurality of particles from the sample overlap with a subset of particles associated with the threat signature; and
    identifying the sample as a threat.

7. The computer-implemented method of claim 1, wherein the sample source includes one or more of a storage service, a memory dump, a disk image, or an ISO container.

8. The computer-implemented method of claim 1, wherein the bytes of a particle from the plurality of particles are unique as compared to other bytes in that particle.

9. A system comprising:
    a first one or more electronic devices to implement a database service in a multi-tenant provider network; and
    a second one or more electronic devices to implement a threat scanning service in the multi-tenant provider network, the threat scanning service including instructions that upon execution cause the threat scanning service to:
        obtain a sample from a sample source;
        generate a plurality of particles from the sample, wherein each particle from the plurality of particles is an array on unique bytes generated based on one or more particle properties, and wherein the bytes of a particle from the plurality of particles are unique as compared to other bytes in that particle; and
        determine whether the sample is associated with a known threat by comparing the plurality of particles to particle threat signatures in a threat database.

10. The system of claim 9, wherein to generate a plurality of particles from the sample, wherein each particle from the plurality of particles is an array of unique bytes generated based on one or more particle properties, the instructions, when executed, further cause the threat scanning service to:
    parse the sample to identify a first array of bytes;
    remove at least one repeating byte from the first array of bytes based on the one or more particle properties to generate a first array of unique bytes; and
    compress the first array of unique bytes to generate a first particle of the plurality of particles.

11. The system of claim 10, wherein to compress the first array of unique bytes to generate a first particle of the plurality of particles, the instructions, when executed, further cause the threat scanning service to:
    store a value in a signal bit of the particle to indicate that the first particle is compressed; and
    encode a unique code and a match index for each of the at least one repeating byte removed from the first array of bytes, the unique code identifying a location of the at least one repeating byte in the first array of bytes, and the match index identifying a byte corresponding to a value of the at least one removed byte.

12. The system of claim 9, wherein to generate a plurality of particles from the sample, wherein each particle from the plurality of particles is an array of unique bytes generated based on one or more particle properties, the instructions, when executed, further cause the threat scanning service to:
    parse the sample to identify a first array of bytes;
    encode the first array of bytes into a first particle of the plurality of particles, wherein a signal bit of the first particle includes a value indicating that the first particle is not compressed.

13. The system of claim 9, wherein the instructions, when executed, further cause the threat scanning service to:
- obtain a plurality of samples associated with a threat family;
- generate a plurality of particles for each sample from the plurality of samples;
- identify a subset of particles shared by the plurality of samples; and
- store the subset of particles as a threat signature associated with the threat family.

14. The system of claim 13, wherein to identify a subset of particles shared by the plurality of samples, the instructions, when executed, further cause the threat scanning service to:
- compare the subset of particles shared by the plurality of samples to particles associated with safe samples stored in a particle safe data store; and
- remove at least one particle from the subset of particles that collides with the particles associated with the safe samples.

15. The system of claim 14, wherein to determine whether the sample is associated with a known threat by comparing the plurality of particles to particle threat signatures in a threat database, the instructions, when executed, further cause the threat scanning service to:
- determine the plurality of particles from the sample overlap with a subset of particles associated with the threat signature; and
- identify the sample as a threat.

16. A computer-implemented method comprising:
- obtaining a sample from a sample source;
- generating a plurality of particles from the sample, wherein each particle from the plurality of particles is an array of unique bytes generated based on one or more particle properties, and wherein the generating comprises:
  - parsing the sample to identify a first array of bytes; and
  - encoding the first array of bytes into a first particle of the plurality of particles, wherein a signal bit of the first particle includes a value indicating that the first particle is not compressed; and
- determining whether the sample is associated with a known threat by comparing the plurality of particles to particle threat signatures in a threat database.

17. The computer-implemented method of claim 16, wherein the one or more particle properties include one or more of a minimum number of bytes, a data type, or a maximum number of repeating bytes.

18. The computer-implemented method of claim 16, wherein the bytes of a particle from the plurality of particles are unique as compared to other bytes in that particle.

19. A computer-implemented method comprising:
- obtaining a sample from a sample source;
- generating a plurality of particles from the sample, wherein each particle from the plurality of particles is an array of unique bytes generated based on one or more particle properties, and wherein bytes of a particle from the plurality of particles are unique as compared to other bytes in the particle; and
- determining whether the sample is associated with a known threat by comparing the plurality of particles to particle threat signatures in a threat database.

20. The computer-implemented method of claim 19, wherein the one or more particle properties include one or more of a minimum number of bytes, a data type, or a maximum number of repeating bytes.

* * * * *